Dec. 26, 1967     A. R. HATCH     3,360,296

VISOR MOUNTING APPARATUS

Filed March 9, 1966

INVENTOR.
ARTHUR R. HATCH
BY
Carl J. Barbee
ATTORNEY

United States Patent Office 3,360,296
Patented Dec. 26, 1967

3,360,296
VISOR MOUNTING APPARATUS
Arthur R. Hatch, Plymouth, Mich., assignor to American Motors Corporation, Kenosha, Wis., a corporation of Maryland
Filed Mar. 9, 1966, Ser. No. 533,006
5 Claims. (Cl. 296—97)

The invention relates to a sun visor for an automotive vehicle and the mounting means employed therefor.

In a typical sun visor installation, the visor must be capable of rotative movement about the axis of the rod which supports it and it must also be capable of rotative movement about an axis which is at right angles to the rod axis.

The principal object of the invention is to provide a mounting means comprised of two injection molded plastic brackets which are mounted with reference to each other so as to support the sun visor in a manner to accommodate its range of movements.

Another object is to provide an inexpensive mounting bracket assembly for a sun visor wherein two injection molded plastic brackets have the appropriate configurations for performing the desired functions.

Other objects and advantages will be apparent from the ensuing specification and appended drawing in which.

Figure 1:
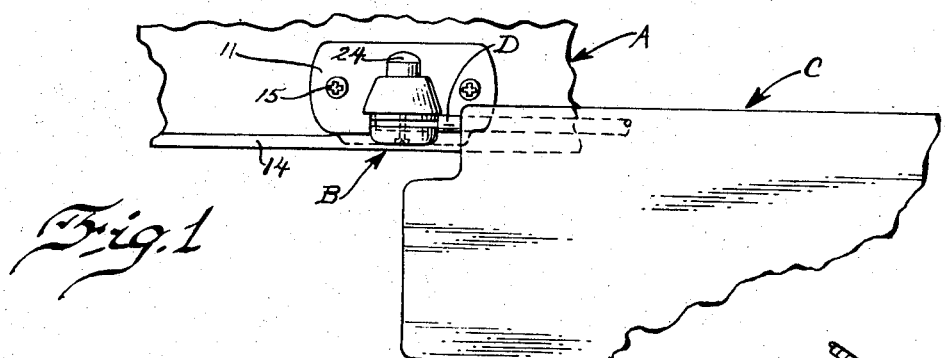
FIGURE 1 is a head-on view on a reduced scale of the mounting bracket assembly with the vehicle roof rail and the sun visor both shown fragmentarily.

In general, referring to FIGURE 1, the vehicle body includes a roof rail A to which the visor mounting B is secured. The visor C is mounted on a rod D so as to be capable of being rotated relative to the rod about the axis thereof. The frictional loading of rod and the visor bore through which the rod passes is adequate to cause the visor to remain in the selected position to which it is adjusted.

The bracket assembly includes the mounting bracket B and the pivot bracket 10. The mounting bracket has base portion 11 with a tongue 12 which is received in the roof rail lip 14. Then the base is anchored securely to the roof rail as by means of screws 15. Integral with the base and projecting outwardly therefrom is a boss which includes a semi-circular wall 16 providing a tapered bearing surface 17 for coaction with the frusto-conical outer surface 18 of the pivot bracket 10. The boss also includes a hub portion 19 having a central bore 20 for receiving the cylindrical stem 21 on the pivot bracket 10. The stem has a tapered bore 22 into which the shank 23 of the rivet 24 is received.

The frusto-conical external surface 18 has approximately the same degree of taper as the surface 17. In order to obtain the desired frictional loading between tapered surfaces, the rivet 24 is installed by ultrasonic vibration and pressure. The shank 23 of the rivet is knurled and is received in the undersize hole 22. Then by using ultrasonic vibration and pressure, the knurled rivet is driven into an undersize hole in upper stem end of the pivot bracket.

This rivet under predetermined pressure of assembly and accurately controlled will provide sufficient frictional pressure. This ultrasonic welding process will provide a secure attachment by locally melting the plastic at the interface of rivet and its hole, allowing plastic to flow into intimate contact with rivet knurling to form a secure attachment in the matter of seconds.

Figure 2:
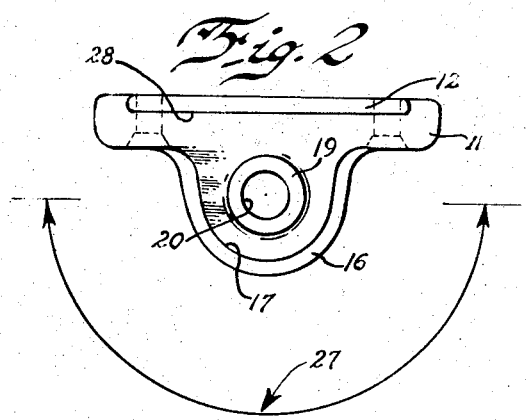
FIGURE 2 is an underneath detail view of the sun visor mounting bracket.
Figure 4:
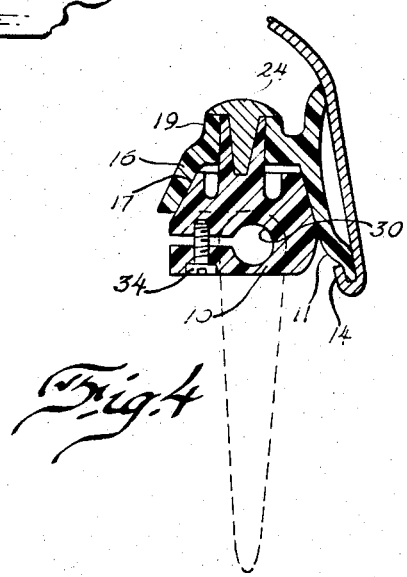
FIGURE 4 is a sectional side view of the bracket assembly but with the pivot bracket rotated 90 degrees with reference to the mounting bracket.

Thus, viewing FIGURE 1, the visor C can be swung about the axis of the bracket stem 21 throughout a range of about 180 degrees, as indicated by the arcuate line 27, in FIGURE 2. Due to the frictional loading, the visor will stay in any pre-selected position until changed again. Viewing FIGURES 2 and 4, it will be noted that the base portion 11 has a portion of its surface area, indicated by the numeral 28, located at a distance from the axis of stem 21 so as to match the distance from surface 17 to said axis. Thus the frusto-conical surface 18 can engage the base area 28 which serves to provide additional bearing surface during the swinging of the visor about the axis of stem 21.

Figure 3:
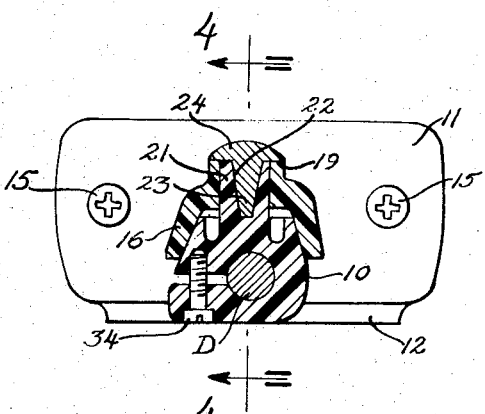
FIGURE 3 is a sectional head-on view of the bracket assembly.
Figure 5:
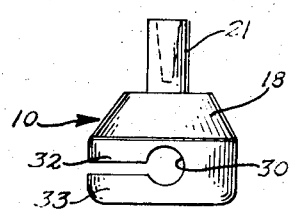
FIGURE 5 is a detail view of the pivot bracket.

The pivot bracket has a diametric bore 30 therethrough and the end of rod D is received in the bore. The bracket also has a slot which opens into bore 30, providing a clamp, which includes an upper jaw 32 and a lower jaw 33 and bolt 34 threads into the upper jaw. The tightening of the bolt will securely clamp the end of the visor support rod relative to the pivot bracket. It will be noted that in FIGURE 4 the pivot bracket is rotated 90 degrees from the position shown in FIGURE 3.

I claim:

1. For use with an automotive vehicle having a body, a wind-shield mounted in an opening in the body and a sun visor: means for mounting the visor on the body, said means including a mounting bracket having a base portion secured to the body, a boss integral with the base and projecting outwardly therefrom, the underside of the boss having a surface formed as a portion of a cone; a hub portion above the conical surface and having a bore therethrough; a pivot bracket having a stem projecting through the bore and a frusto-conical external surface for engaging the conical surface on the boss; a rivet having a head engaging the upper end of the hub, whereby to establish a frictional loading between the mounting bracket and the pivot bracket; a rod fastened to the pivot bracket and the sun visor being carried on the rod.

2. For use with an automotive vehicle having a roof, a wind-shield beneath the roof and a sun visor mounted on the roof: means for mounting the visor on the roof, said means including,
  (a) a mounting bracket having a base portion secured to the roof,
  (b) a boss integral with the base and projecting outwardly therefrom,
  (c) the underside of the boss having a surface formed as a portion of a cone,
  (d) a hub portion above the conical surface and having a bore therethrough,
  (e) a pivot bracket having a stem projecting through the bore and a frusto-conical external surface for engaging the conical surface on the boss,
  (f) said pivot bracket having a bore therein transverse to the axis of the stem,
  (g) a rod on which the visor is mounted being received in the pivot bracket bore,
  (h) a rivet having a head engaging the upper end of the hub, whereby to establish a frictional loading between the mounting bracket and the pivot bracket.

3. Apparatus as set forth in claim 2 wherein the base portion has an area sufficiently close to the hub so as to serve as a bearing surface for the conical surface of the pivot.

4. Apparatus as set forth in claim 2 wherein the stem of the pivot bracket has a tapered bore therein and the shank of the rivet is tightly received in said bore.

5. Apparatus as set forth in claim 2 wherein the mounting bracket and pivot bracket are of synthetic resin material in the form of injection moldings.

References Cited
UNITED STATES PATENTS

| | | | |
|---|---|---|---|
| 2,965,415 | 12/1960 | Dryden | 296—97 |
| 3,214,125 | 10/1965 | Pyuro | 248—289 |

LEO FRIAGLIA, *Primary Examiner.*

L. D. MORRIS, *Assistant Examiner.*